(No Model.)

P. J. McLAIN.
TIRE FOR BICYCLES.

No. 555,464. Patented Feb. 25, 1896.

Witnesses

Inventor
P. J. McLain.
By his Attorney

UNITED STATES PATENT OFFICE.

PETER J. McLAIN, OF DENVER, ASSIGNOR OF NINE-SIXTEENTHS TO NANCY DEMANDEL, OF VICTOR, AND EMMET P. BREWER, OF DENVER, COLORADO.

TIRE FOR BICYCLES.

SPECIFICATION forming part of Letters Patent No. 555,464, dated February 25, 1896.

Application filed June 26, 1895. Serial No. 554,169. (No model.)

*To all whom it may concern:*

Be it known that I, PETER J. McLAIN, a citizen of the United States of America, residing at Denver, in the county of Arapahoe and State of Colorado, have invented certain new and useful Improvements in Tires for Bicycles and Light Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in tires for bicycles and light vehicles.

My object is to provide a resilient metal tire having the maximum strength and durability with a minimum weight of material.

The invention consists, briefly stated, of a rim forming the inner periphery of the tire, a number of wires forming the outer periphery, and intermediate yielding braces located at suitable intervals, said braces being movably attached to the rim and engaged by the wires which are mounted or supported thereon.

The invention will be fully understood by reference to the accompanying drawings, in which is illustrated an embodiment thereof.

Figure 1:
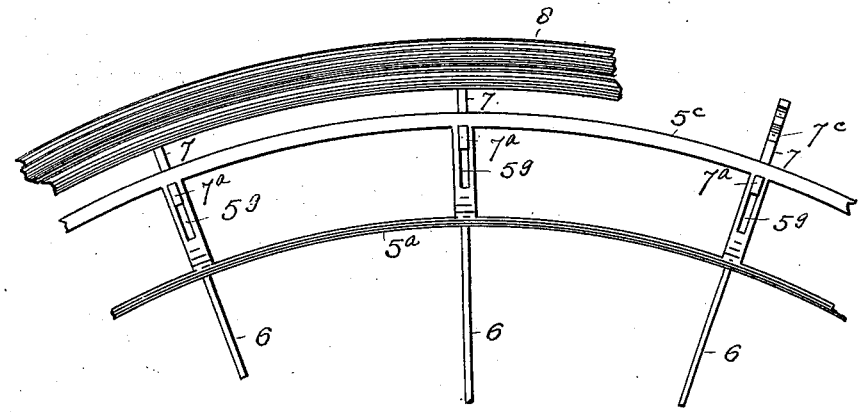
Figure 2:
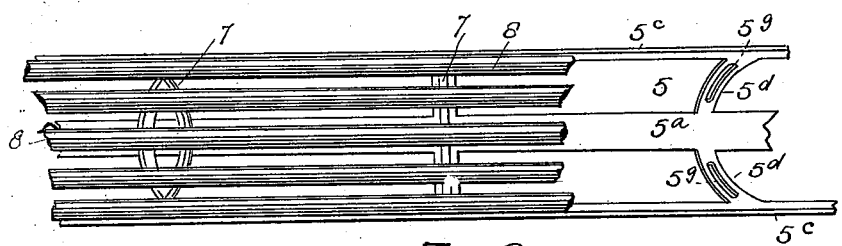
Figure 3:
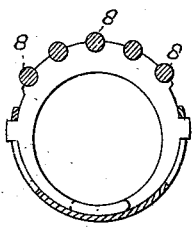
Figure 4:
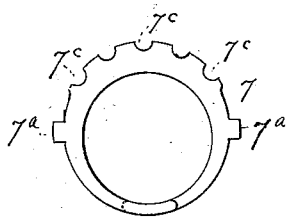

In the drawings, Figure 1 is a fragmentary side elevation of my improved tire. Fig. 2 is a top view of the same. Fig. 3 is a cross-section taken through the tire. Fig. 4 is a detail view of one of the yielding braces.

Similar reference characters indicate corresponding parts in the views.

Let the numeral 5 designate a skeleton rim which, as shown in the drawings, comprises three parts—namely, a central part $5^a$ and two parts $5^c$, one being located on each side of the part $5^a$. The rim parts are connected by arms $5^d$. The part $5^a$ is preferably composed of a narrow band of metal, while the parts $5^c$ may be wires of any desired shape in cross-section. I do not, however, limit the invention to the construction of rim shown, as I am aware that other forms may be employed without departing from the spirit of the invention.

Attached to the rim at suitable intervals are the braces 7, which are circular in shape and have overlapping extremities, whereby the brace is allowed to yield to pressure. These braces are provided with lugs $7^a$ which enter slots $5^g$ formed in the arms $5^d$ of the rim. The slots $5^g$ are considerably longer than the engaging-lugs to permit the desired movement of the braces when subjected to pressure. The lugs $7^a$ normally occupy the extremities of the slots adjacent the parts $5^c$ of the rim. Hence, as the pressure is applied to that portion of the rim engaging the surface upon which the tire rests, the lugs $7^a$ move downward in the slots $5^g$ or toward the central part $5^a$ of the rim, the overlapping extremities of the braces having a corresponding movement.

The peripheries of the braces 7 are provided with recesses $7^c$, which are engaged by wires 8, which form the outer part of the tire or that engaging the ground or other supporting-surface. The recesses $7^c$ of the braces form seats for the wires 8.

The spokes 6 are attached to the central part $5^a$ of the rim in any suitable manner.

Having thus described my invention, what I claim is—

1. In a tire of the class described, the combination of the rim forming the inner periphery, the wires forming the outer periphery, and the intermediate, resilient braces movably attached to the rim and supporting the wires which are mounted thereon, substantially as described.

2. In a tire, the combination of the rim provided with transverse slots, the resilient braces having lugs engaging the rim-slots, and wires engaging the braces, the latter being constructed to support the former and maintain them in position, substantially as described.

3. In a tire, the combination of the skeleton rim having transverse slots, the resilient braces having lugs engaging said slots, and wires mounted on the braces, substantially as described.

4. In a tire, the combination of the rim, circular braces having movable, overlapping extremities, said braces being movably attached to the rim, and wires mounted on the braces, substantially as described.

5. In a tire, the combination of the skeleton rim having transverse slots, the circular braces having movable extremities and provided with lugs engaging the slots in the rim, and wires engaging notches or recesses formed in the outer edges of the braces, substantially as described.

In testimony whereof I affix my signature in the presence of two witnesses.

PETER J. McLAIN.

Witnesses:
 CHAS. E. DAWSON,
 ALFRED J. O'BRIEN.